United States Patent [19]

Peckjian

[11] Patent Number: 5,761,924
[45] Date of Patent: Jun. 9, 1998

[54] REFRIGERANT RECYCLING APPARATUS AND METHOD

[75] Inventor: Bryan M. Peckjian, Huntingdon Valley, Pa.

[73] Assignee: National Refrigeration Products, Bensalem, Pa.

[21] Appl. No.: 588,538

[22] Filed: Jan. 18, 1996

[51] Int. Cl.⁶ ................................................ F25B 45/00
[52] U.S. Cl. ........................................ 62/292; 62/77
[58] Field of Search .............................. 62/292, 85, 77, 62/149, 475

[56] References Cited

U.S. PATENT DOCUMENTS

| | | |
|---|---|---|
| 2,532,452 | 12/1950 | Hoesel . |
| 3,232,070 | 2/1966 | Sparano et al. . |
| 3,425,238 | 2/1969 | Sylvan . |
| 4,170,116 | 10/1979 | Williams . |
| 4,242,878 | 1/1981 | Brinkerhoff . |
| 4,261,178 | 4/1981 | Cain . |
| 4,285,206 | 8/1981 | Koser . |
| 4,363,222 | 12/1982 | Cain . |
| 4,412,431 | 11/1983 | Waldrep . |
| 4,458,497 | 7/1984 | Kubic . |
| 4,476,688 | 10/1984 | Goddard . |
| 4,476,693 | 10/1984 | Johnson . |
| 4,480,446 | 11/1984 | Margulefsky et al. . |
| 4,513,578 | 4/1985 | Proctor et al. . |
| 4,550,573 | 11/1985 | Rannenberg . |
| 4,566,291 | 1/1986 | Halavais . |
| 4,584,838 | 4/1986 | Abu-Judom, II . |
| 4,688,388 | 8/1987 | Lower et al. . |
| 4,766,733 | 8/1988 | Scuderi . |
| 4,805,416 | 2/1989 | Manz et al. . |
| 4,809,515 | 3/1989 | Houwink . |
| 4,809,520 | 3/1989 | Manz et al. . |
| 4,856,289 | 8/1989 | Lofland . |
| 4,856,290 | 8/1989 | Rodda . |
| 4,934,390 | 6/1990 | Sapp . |
| 4,938,031 | 7/1990 | Manz et al. . |
| 4,942,741 | 7/1990 | Hancock et al. . |
| 4,969,495 | 11/1990 | Grant . |
| 4,996,848 | 3/1991 | Nelson et al. . |
| 4,998,413 | 3/1991 | Sato et al. . |
| 5,020,331 | 6/1991 | Michny . |
| 5,046,320 | 9/1991 | Loose et al. . |
| 5,095,713 | 3/1992 | Laukhuf et al. . |
| 5,127,239 | 7/1992 | Manz et al. . |
| 5,146,761 | 9/1992 | Cavanaugh et al. . |
| 5,170,632 | 12/1992 | Reilly, Jr. et al. . |
| 5,172,562 | 12/1992 | Manz et al. . |
| 5,230,224 | 7/1993 | Ricketts et al. . |
| 5,247,802 | 9/1993 | Maniez et al. . |
| 5,282,366 | 2/1994 | Reilly, Jr. et al. . |

OTHER PUBLICATIONS

RIGID SystemSafe brochure entitled "RS–200 Refrigerant Recovery Unit" dated 1993.

OZsaver Light Operations Manual entitled "Recovery & Charging Station".

SRD 1 Operations Manual entitled "Streamline Recovery Device".

National Refrigeration Products catalog data 1992.

Primary Examiner—John M. Sollecito
Attorney, Agent, or Firm—Dickstein Shapiro Morin & Oshinsky LLP

[57] ABSTRACT

A refrigerant recycling apparatus for use in conjunction with a refrigerant recovery unit for transferring refrigerant from a first container to a second container. The refrigerant recovery unit includes a compressor having a suction side and a discharge side. The refrigerant recycling apparatus comprises a first section including a filter having a filter inlet and a filter outlet. A first conduit is provided in fluid communication between the filter inlet and the first container. A heater is provided along the first conduit. A second conduit is provided in fluid communication between the filter outlet and the refrigerant recovery unit inlet. The refrigerant recycling apparatus has a second section including an oil separator fluidly connected in series with a condenser having an inlet and an outlet. A third conduit is provided between the refrigerant recovery unit outlet and the oil separator. The condenser outlet is in fluid communication with the second container.

11 Claims, 2 Drawing Sheets

REFRIGERANT RECYCLING APPARATUS AND METHOD

FIELD OF THE INVENTION

The present invention relates to refrigeration equipment and, more particularly, to a refrigerant recycling apparatus used in conjunction with refrigerant recovery.

BACKGROUND OF THE INVENTION

Commercial and residential refrigeration systems, such as refrigerators, air-conditioners, heat pumps and other small air-conditioning and refrigeration systems use chlorofluorocarbons (CFC's) as a standard heat-transfer media. For many years, when a refrigeration system needed servicing, it was common practice in the industry to simply release the refrigerant to the atmosphere. That practice is no longer acceptable, nor it is responsible to abandon CFC-containing equipment because the CFC's will eventually leak out. It has therefore become increasingly desirable to service CFC-containing units in a manner which prevents any loss of CFC's to the atmosphere or the environment, and to remove CFC's from non-serviceable units before the refrigerant leaks out.

Several systems are known for evacuating a charged refrigeration system of its refrigerant and storing it in a receiving container.

One known system provides a portable refrigerant recovery and purification system which consists of an evaporator, a compressor, a condenser and a refrigerant storage container mounted on a two-wheeled hand truck. Refrigerant is passed through the evaporator, compressed by the compressor, reliquified in the condenser and passed to a storage container.

Another known system for withdrawing and charging refrigerant from or into a refrigeration system passes withdrawn refrigerant through a vaporizing coil to prevent liquid refrigerant from entering a positive displacement transfer pump. Refrigerant vapor from the pump outlet is liquefied in a cooling coil/heat exchanger, which is in communication with a refrigerant storage container.

Another known refrigerant reclamation and charging unit has a compressor and a condenser, and is operated in two different configurations, depending on whether liquid refrigerant or vaporized refrigerant is being recovered. In the first configuration, liquid refrigerant is removed from a disabled refrigeration unit directly to a storage container by forcing vaporized refrigerant from the refrigerant recovery system compressor into the disabled refrigeration unit. After all the liquid refrigerant has been removed from the disabled refrigeration unit, the hoses are re-configured such that the compressor pulls a vacuum on the disabled refrigeration unit to remove the vaporized refrigerant.

Another known system for recovering and purifying refrigerant from a disabled refrigeration unit initially passes the recovered refrigerant through an oil trap and acid purification filter-dryer to remove impurities before the refrigerant gas enters the compressor. The compressed gas is passed through a condenser and converted to a liquid. The liquefied refrigerant is then passed to an acid-purification filter-dryer and into a receiving tank. The level of refrigerant within the receiving tank is not monitored, and no control means is provided to control refrigerant input in the system based upon the level of refrigerant in the recovery tank. The liquefied gas may be discharged to an external holding tank or a portion of the liquefied gas may be used to cool the gas in the condenser coils. A high-pressure purge feature allows residual refrigerant in the system to be purged to the atmosphere.

It would be desirable to withdraw both liquid and vaporized refrigerant from a disabled refrigeration unit without requiring the operator to change hoses or readjust the recovery equipment. It would also be desirable to provide an apparatus and method for recovering and recycling refrigerant in a single operation to remove contaminants such that the recovered refrigerant meets the requirements of the industry recycling guidelines (IRG-2) and the Air-conditioning and Refrigeration Institute Standard 740 concerning water, fluoride ion, acidity, non-boiling residues and particulates/solids. It would also be desirable to utilize existing refrigerant recovery equipment for refrigerant recovery and filtering, to the extent possible, in order to reduce the capital investment required for new equipment.

The present invention is the result of observation of the limitations in the prior art devices, and efforts to solve them.

SUMMARY OF THE INVENTION

Briefly, the present invention provides a refrigerant recycling apparatus for use in conjunction with a refrigerant recovery unit for transferring refrigerant from a first container to a second container. The refrigerant recovery unit includes a compressor having a suction side and a discharge side. The suction side of the refrigerant recovery unit compressor is in fluid communication with an inlet. The inlet is adapted for connection with a first container. The discharge side of the refrigerant recovery unit compressor is in fluid communication with an outlet. The outlet is adapted for connection to a second container. The refrigerant recycling apparatus comprises a first section including a filter having a filter inlet and a filter outlet. A first conduit is provided in fluid communication between the filter inlet and the first container. A heater is located along the first conduit. A second conduit is provided in fluid communication between the filter outlet and the refrigerant recovery unit inlet. The refrigerant recycling apparatus has a second section including an oil separator fluidly connected in series with a condenser having an inlet and an outlet. A third conduit is provided between the refrigerant recovery unit outlet and the oil separator. The condenser inlet is in fluid communication with the oil separator and the condenser outlet is in fluid communication with the second container.

In another aspect, the present invention provides a refrigerant recycling apparatus for use in conjunction with a refrigerant recovery unit for transferring refrigerant from a first container through a refrigerant recovery hose with a releasable hose coupling fitting to a second container through a refrigerant discharge hose with a releasable hose coupling fitting. The refrigerant recovery unit generally includes a compressor having a suction side and a discharge side. The suction side of the compressor is in fluid communication with a first releasable hose coupling fitting exposed on the refrigerant recovery unit. The discharge side of the compressor is in fluid communication with a second releasable hose coupling fitting exposed on the refrigerant recovery unit. The refrigerant recycling apparatus comprises a first section including a filter having a filter inlet and a filter outlet. A first conduit is provided in fluid communication between the filter inlet and a third releasable hose coupling fitting exposed on the apparatus. The third releasable hose coupling is adapted for connection to the releasable hose coupling fitting of the refrigerant recovery hose. A heater is located along the first conduit. A second conduit is provided in fluid communication between the filter outlet and a fourth releasable hose coupling fitting exposed on the apparatus. The fourth releasable hose coupling fitting is adapted for connection to the first releasable hose coupling fitting on the refrigerant recovery unit. The refrigerant recycling apparatus further comprises a second section including an oil separator fluidly connected in series with a condenser having a condenser inlet and a condenser outlet. A third conduit is provided in fluid communication between the oil separator and a fifth releasable hose coupling fitting exposed on the apparatus. The fifth releasable hose coupling fitting is adapted for connection to the second releasable hose coupling fitting on the refrigerant recovery unit. A fourth conduit is provided in fluid communication between the condenser outlet and a sixth releasable hose coupling fitting exposed on the apparatus. The sixth releasable hose coupling fitting is adapted for connection with the releasable hose coupling fitting of the refrigerant discharge hose.

In another aspect, the present invention provides a method of recycling refrigerant as it is being recovered from a first container by a refrigerant recovery unit and being transferred to a second container. The method comprises the steps of: connecting an inlet of a first section of a refrigerant recycling apparatus to the first container; connecting the outlet for the first section of the refrigerant recycling apparatus to an inlet of the refrigerant recovery unit; connecting an outlet of the refrigerant recovery unit to an inlet of a second section of the refrigerant recycling apparatus; connecting an outlet of the second section of the refrigerant recycling apparatus to the second container; drawing a flow of refrigerant from the first container through the first section of the refrigerant recycling apparatus toward the refrigerant recovery unit; detecting if the refrigerant is in a liquid state or a vapor state; heating the liquid refrigerant in the first section of the refrigerant recycling apparatus to vaporize the refrigerant; filtering the vaporized refrigerant to remove moisture and contaminants; passing the vaporized refrigerant into the refrigerant recovery unit; compressing the vaporized refrigerant in the refrigerant recovery unit to form a relatively high temperature, high pressure vaporized refrigerant; passing the high temperature, high pressure vaporized refrigerant from the outlet of the refrigerant recovery unit to the inlet of the second section of the refrigerant recycling apparatus; separating oil from the high temperature, high pressure vaporized refrigerant; condensing the high temperature, high pressure vaporized refrigerant to form a liquid refrigerant; and transferring the liquid refrigerant to the second container.

A further aspect of the present invention is a method of clearing trapped refrigerant from a refrigerant recycling apparatus being used in conjunction with a refrigerant recovery unit. The refrigerant recovery unit includes a compressor having a suction side and a discharge side and the recycling apparatus comprises a first section and a second section. The first section includes a filter having a filter inlet and a filter outlet, a first conduit in fluid communication between the filter inlet and a refrigerant inlet of the first section, a heater located along the first conduit, a second conduit in fluid communication between the filter outlet and the refrigerant recovery unit inlet. The second section includes an oil separator fluidly connected in series with a condenser having an inlet and an outlet, and a third conduit between the refrigerant recovery unit outlet and the oil separator, the condenser inlet being in fluid communication with the oil separator and the condenser outlet being in fluid communication with the second container. The method comprises the steps of:

(a) providing a fluid connection between first and second sections of the refrigerant recycling apparatus and the suction side of the compressor; and (b) drawing a vacuum with the compressor in the first and second sections of the refrigerant recycling apparatus, including the first and second conduits and the filter and third conduit and the condenser.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENT

Figure 1:
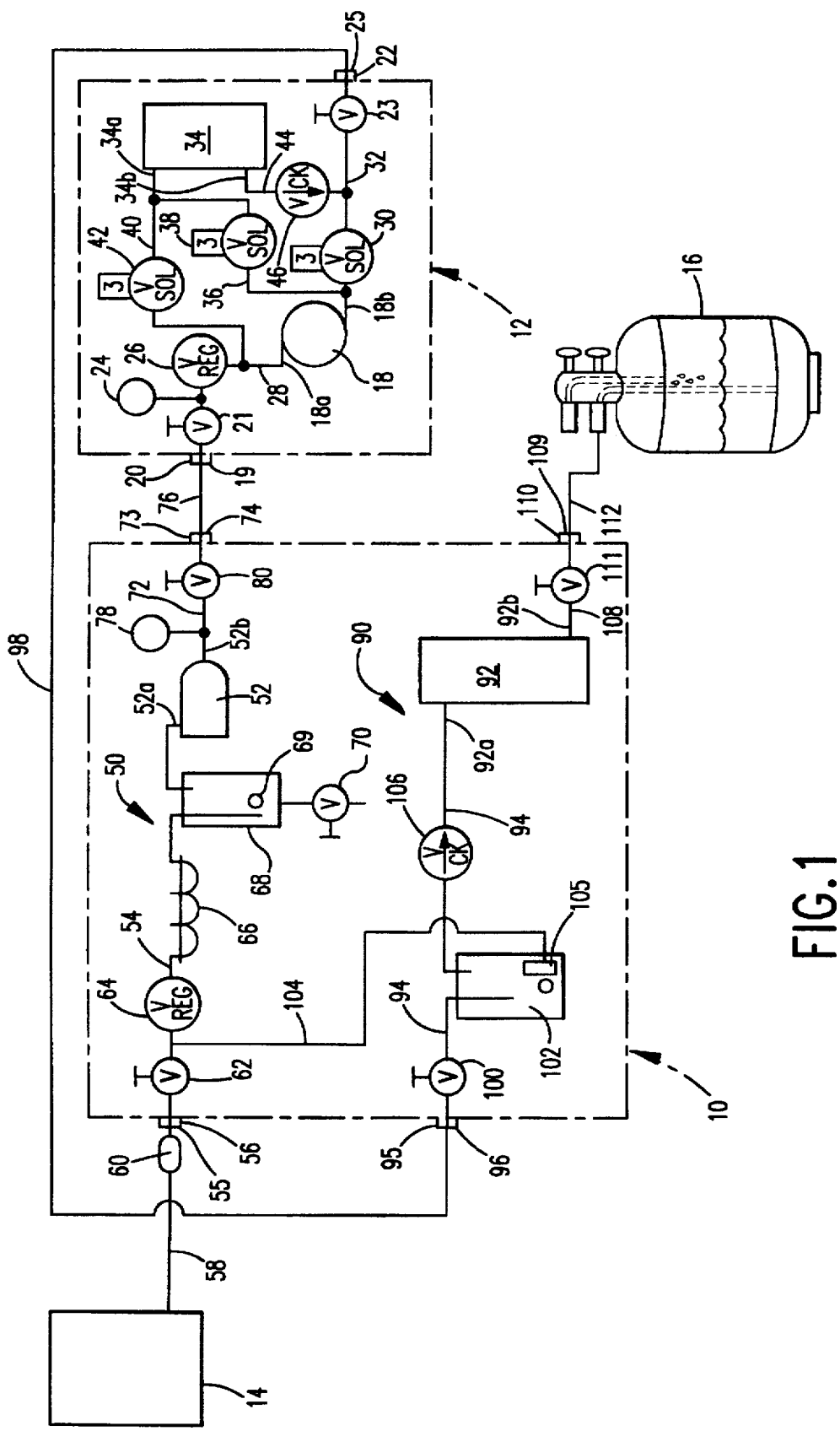
FIG. 1 is a schematic diagram of a refrigerant recycling apparatus in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the refrigerant recycling apparatus and designated parts thereof The terminology includes the words above specifically mentioned, derivatives thereof and words of similar import.

Figure 2:
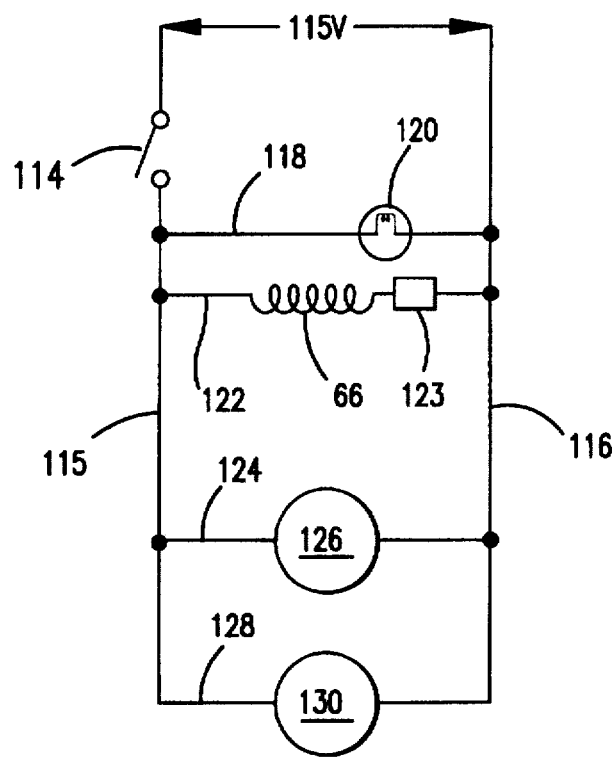
FIG. 2 is a wiring diagram for the refrigerant recycling apparatus of FIG. 1.
Figure 3:
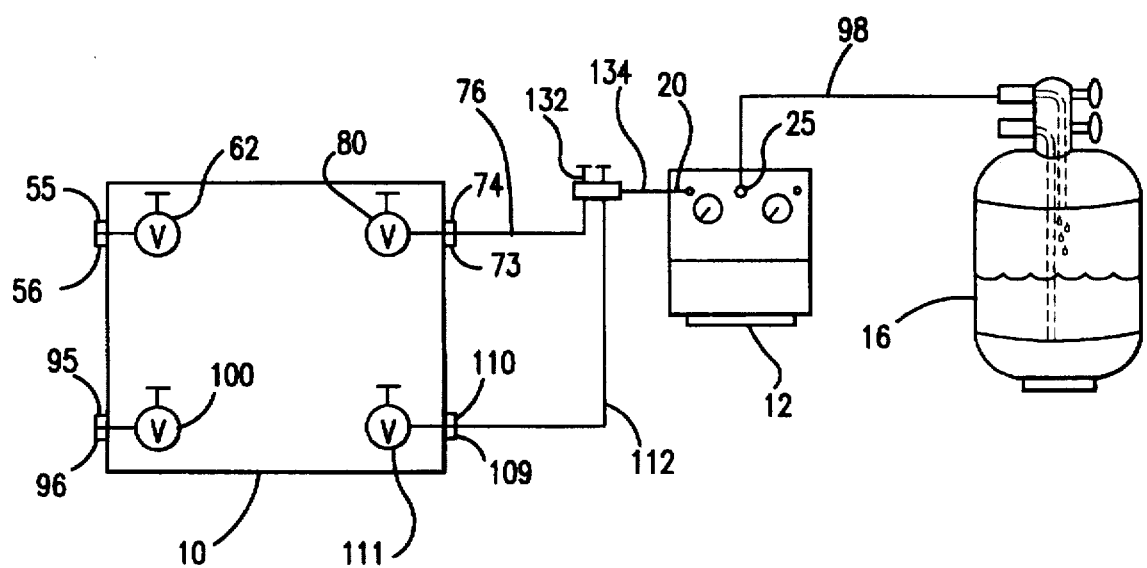
FIG. 3 is a schematic diagram of the refrigerant recycling apparatus in a pump-out configuration.

Referring to the drawings, wherein like numerals indicate like elements throughout, there is shown in FIGS. 1-3 a refrigerant recycling apparatus, generally designated 10 (hereinafter the "recycling apparatus 10", in accordance with the present invention. As shown in FIG. 1, the recycling apparatus 10 is intended for use in conjunction with a refrigerant recovery unit, generally designated 12, for transferring refrigerant from a first container 14 to a second container 16. The recovery unit 12 generally includes a compressor 18 having a suction side 18a and a discharge side 18b. The suction side 18a of the compressor 18 is in fluid communication with an inlet 19, preferably provided in the form of a first releasable hose coupling or, more particularly, a fitting 20 of such coupling exposed on the recovery unit 12. When used in a stand alone mode, the inlet 19 of the recovery unit is adapted by the provision of the fitting 20 for connection with a first container. The discharge side 18b of the compressor 18 is in fluid communication with an outlet 22, preferably in the form of a second releasable hose coupling fitting 25 exposed on the recovery unit 12. When the recovery unit 12 is operated without the recycling apparatus 10, the outlet 22 is generally adapted by provision of the fitting 25 for connection to a second container.

The illustrated refrigerant recovery unit 12 further includes a shut--off valve 21, a standard pressure indicator or gauge 24 and a pressure regulator 26 located in series along an inlet conduit 28 which extends between the inlet 19 and the suction side 18a of the compressor 18. A first solenoid valve 30 and a shut-off valve 23 are located along an outlet conduit 32 which is in fluid communication between the discharge side 18b of the compressor 18 and the outlet 22. The recovery unit 12 further includes a condenser 34 having a condenser inlet 34a and a condenser outlet 34b. A condenser conduit 36 is in fluid communication between the condenser inlet 34a and the discharge side 18b of the compressor 18. A second solenoid valve 38 is located in the condenser conduit 36. A bypass conduit 40 is in fluid communication between the suction side 18a of the compressor 18 and the condenser inlet 34a. A third solenoid valve 42 is located in the bypass conduit 40. A condenser outlet conduit 44 is in fluid communication between the condenser outlet 34b and the outlet conduit 32. A check valve 46 is located in the condenser outlet conduit 44. Recovery units of this type are available from National Refrigeration Products, the assignee of the present application, as model numbers LV1 and ULV1. Such recovery units can be operated in a pump-out mode wherein the inlet shut-off valve 21 and the second solenoid valve 38 are closed and the first and third solenoid valves 30 and 42 are open such that the refrigerant is drawn from the condenser 34, the condenser conduit 36, the condenser outlet conduit 44 and the bypass conduit 40, compressed by the compressor 18 and passed through the outlet conduit 32 and the recovery unit outlet 22 to a storage container to evacuate the recovery unit 12. However, those of ordinary skill in the art will understand from the present disclosure that other types of recovery units can be utilized in accordance with the present invention as long as the recovery units have a pump-out mode (or other similar mode) wherein the vaporized refrigerant is passed directly from the compressor 18 to the recovery unit outlet 22, without being condensed in the condenser 34. These include recovery unit model numbers LV8 and LV20, which are available from National Refrigeration Products. It will be similarly recognized that recovery units with an oilless compressor can be used even without a pump-out mode.

Still with reference to FIG. 1, the first container 14 may be a small appliance, such as a household refrigerator, air-conditioning unit, or heat pump, or any other small air-conditioning and/or refrigeration system well known to those of ordinary skill in the art. The present invention is also not limited to use with these specific types of refrigerant containers discussed above, and they also may be used to recover refrigerant from automotive air conditioners, for example, as is understood by the ordinarily skilled artisan. The second container 16 is typically a transportable recovery tank in which the recovered, recycled refrigerant can be stored and later removed.

The refrigerant to be transferred is preferably of the high-pressure type, which exists as both a liquid and a gas at room temperature within the pressurized first container 14. Preferably, refrigerants such as R-12, R-22, R-500, R-502 and R-134a may be recovered and recycled by use of the present invention. Those of ordinary skill in the art will understand from the present disclosure that a wide variety of refrigerants, too numerous to mention, may also be transferred and recycled in accordance with the present invention.

Still with reference to FIG. 1, the recycling apparatus 10 (encompassed in phantom lines) comprises a first section indicated generally at 50 and including a filter 52 having a filter inlet 52a and a filter outlet 52b. Preferably, the filter 52 includes a molecular sieve to absorb moisture, and an activated element to neutralize acids in the refrigerant. One such filter, which is presently preferred, is part number RH-48 from ALCO Controls Company, a Division of Emerson Electric, St. Louis, Mo. However, it is understood by those of ordinary skill in the art from the present disclosure, that other types of molecular sieves and/or acid-absorbing filters can be utilized, if desired.

A first conduit 54 is provided in fluid communication between the filter inlet 52a and the first container 14. More particularly, the first conduit 54 is in fluid communication between the filter inlet 52a and the inlet 55 for the first section 50, preferably in the form of a third releasable hose coupling fitting 56 exposed on the apparatus 10. The third releasable hose coupling fitting 56 is adapted for connection to the first container 14 in a conventional manner, through a refrigerant recovery hose 58 having releasable hose fittings at either end (not shown) which mate with an appropriate fitting on the first container 14 and the third hose coupling fitting 56. Male/female threaded or quick-release mating fittings can be used on the various apparatuses 10 and 12 and hoses (to be discussed below).

Preferably, the first conduit 54 and the other conduits of the apparatus 10 described hereinafter are formed from one or more pieces of copper tubing, unless otherwise indicated. However, it is understood by those of ordinary skill in the art from the present disclosure that the first conduit may be made from other suitable materials which are impervious to the refrigerant(s) to be transferred, such as suitable polymeric or metallic materials.

A pre-filter 60 is preferably located between the third hose coupling fitting 56 and the hose 58. Preferably, the pre-filter 60 is a particulate filter which traps particulate matter in the refrigerant being drawn from the first container 14 to prevent malfunctioning of the components of the recycling apparatus 10 and the recovery unit 12. Pre-filter cartridges such as ALCO number ALF-032, PARKER number PFO52-MS, or SPORLIN number C-052 are used in conjunction with the preferred embodiment. However, it is understood by those or ordinary skill in the art from the present disclosure that other suitable pre-filters can be used, if desired. Preferably, the pressure regulator 64 is a standard pressure regulator known to those of ordinary skill in the art.

A manual shut-off valve 62 and a pressure regulator 64 are located in series along the first conduit 54. Preferably, the valve 62 is a hand-operated ball valve. However, it is understood by those of ordinary skill in the art from the present disclosure that other types of valves may be used, such as an automatically controlled solenoid valve or a gate valve.

Still with reference to FIG. 1, a heater 66 is located along the first conduit 54. In the preferred embodiment, the heater 66 comprises a cartridge type electrical resistance heater having a copper tube for carrying the refrigerant tightly coiled around the periphery of the cartridge heater. A thermostat 123, shown in FIG. 2 and described in more detail below, for controlling the cartridge heater is affixed to the outside portion of the coiled tube. Preferably, the copper tube has a 3/16 inch inside diameter. However; it is understood by those of ordinary skill in the art from the present disclosure that other types of heaters can be used, if desired.

Still with reference to FIG. 1 a contaminant accumulator 68 is provided in fluid communication with the first conduit 54 between the filter 52 and the heater 66. The contaminant accumulator 68 is of the type generally known to those of ordinary skill in the art, and includes a drain valve 70 for periodically draining accumulated contaminants.

Still with reference to FIG. 1, the first section 50 of the recycling apparatus 10 includes a second conduit 72 in fluid communication between the filter outlet 52b and the refrigerant recovery unit inlet 19. More particularly, the second conduit 72 is in fluid communication between the filter outlet 52b and the outlet 73 for the first section 50, preferably in the form of a fourth releasable hose coupling fitting 74 exposed on the apparatus 10. The fourth releasable hose coupling fitting 74 is adapted for connection to the first releasable hose coupling 20 on the refrigerant recovery unit 12 by conventional means through the use of a second refrigerant hose 76 with mating fittings in a manner generally known to those of ordinary skill in the art. Preferably, a pressure gauge 78 and a manual shutoff valve are located in series in the second conduit 72 adjacent to the fourth hose coupling fitting 74.

Still with reference to FIG. 1, the recycling apparatus 10 further comprises a second section 90. The second section 90 includes an oil separator 102 fluidly connected in series with a condenser 92 having a condenser inlet 92a and a condenser outlet 92b. A third conduit 94 is provided in fluid communication between the refrigerant recovery unit outlet 22 and the oil separator 102. More particularly, the third conduit 94 is in fluid communication between the oil separator 102 and the inlet 95 to the second section 90, preferably in the form of a fifth releasable hose coupling fitting 96 exposed on the apparatus 10. The fifth releasable hose coupling fitting 96 is adapted for connection to the second releasable hose coupling fitting 25 on the refrigeration recovery unit 12 through a third refrigerant hose 98 having end fittings which mate with the fittings 96 and 25 in a manner known to those of ordinary skill in the art.

Preferably, a third shut-off valve 100 is located in the third conduit 94 adjacent to the fifth releasable hose coupling fitting 96. The third shut-off valve 100 is similar to the first and second shut-off valves 62 and 80 described above.

An oil return line 104 is in fluid communication between the oil separator 102 and the first conduit 54. Preferably, a float valve 105 actuatable between an open and a closed position opens and closes the oil return line 104. The oil return line 104 remains closed until a predetermined level of oil is collected in the oil separator 102, and the float valve 105 is then opened such that the oil is drawn back into the first section 50 of the recycling apparatus 10. The oil separator 102 and the float valve 105 are of the type known to those of ordinary skill in the art, and accordingly, further description is not believed to be necessary or limiting.

A check valve 106 is provided in the third conduit 94 between the oil separator 102 and the condenser 92. The check valve is of the type known to those of ordinary skill in the art, and accordingly, further description is not believed necessary.

Still with reference to FIG. 1, the condenser inlet 92a is in fluid communication with the oil separator 102 and the condenser outlet 92b is in fluid communication with the second container 16. More particularly, a fourth conduit 108 is in fluid communication between the condenser outlet 92b and the outlet 109 for the second section 90, preferably in the form of a sixth releasable hose coupling fitting 110 exposed on the apparatus 10. The sixth releasable hose coupling fitting 110 is adapted for connection to the second container 16 in a conventional manner through the use of a fourth refrigerant discharge hose 112. A fourth shut-off valve 111 is provided in the fourth conduit 108.

Referring now to FIG. 2, a schematic wiring diagram for the refrigerant recycling apparatus 10 is shown. An ON/OFF switch 114 is connected across a power source, which is preferably 115–120 V A/C source, to control power to the recycling apparatus 10. When the switch 114 is in the ON position, power is provided by conductors 115, 116 to the parallel circuit as described below.

The first circuit element 118 is electrically connected in parallel between conductors 115 and 116 and provides power to an indicator lamp 120 when the ON/OFF switch 114 is on.

The second circuit element 122 is electrically connected in parallel between conductors 115 and 116, and provides power to the heater 66. A thermostat 123 is provided to monitor the temperature of the refrigerant in the heater 66 and to cycle the heater 66 on and off.

The third circuit element 124 is electrically connected in parallel between conductors 115 and 116 to provide power to a timer 126 which tracks the amount of time that the recycling apparatus 10 is being operated.

The fourth circuit element 128 is electrically connected in parallel between conductors 115 and 116 to provide power to the fan 130 of the condenser 92.

It is understood by those of ordinary skill in the art that the various components, such as the valves, pressure gauges, filters and the like are standard items which are readily available, and are interconnected in a manner which is understood by those of ordinary skill in the art. Accordingly, further description is not believed to be necessary and, therefore, it is not provided for convenience only, and is not considered to be limiting.

The method for recycling refrigerant as it is being recovered from a first container 14 by refrigerant recovery unit 12 and being transferred to a second container 16 according to the present invention will now be described generally with reference to FIGS. 1 and 2.

To prepare for refrigerant recovery from the first container 14, the first container 14 is connected with the first refrigerant hose 58 to the third hose coupling fitting 56 at the inlet 55 to the first section 50 of the recycling apparatus 10. The first refrigerant recovery hose 58 may be connected to the vapor port on the first container 14, or to both the liquid and vapor ports on the first container 14, if desired, for example, through a manifold (not shown). The port valve (not shown) on the first container 14 is then opened, and the first shut-off valve 62 on the recycling apparatus 10 is opened. The outlet 73 of the first section 50 of the refrigerant recycling apparatus 10 is connected to the inlet 19 of the refrigerant recovery unit 12. More particularly, the second refrigerant hose 76 is connected between the fourth hose coupling fitting 74 on the refrigerant recycling apparatus 10 and the first inlet hose coupling fitting 20 on the refrigerant recovery unit 12. The second shut-off valve 80 of the refrigerant recycling apparatus 10 and the inlet valve 21 of the refrigerant recovery unit 12 are then opened. The outlet 22 of the refrigerant recovery unit 12 is connected to the inlet 95 of the second section 90 of the refrigerant recycling apparatus 10. More particularly, the third refrigerant hose 98 is connected between the second, releasable hose coupling fitting 25 at the outlet 22 of the refrigerant recovery unit 12 and the fifth releasable hose coupling fitting 96 at the inlet 95 of the second section 90 of the refrigerant recycling apparatus 10. The outlet shut-off valve 23 of the refrigerant recovery unit 12 and the third shut-off valve 100 of the recycling apparatus 10 are then opened. The outlet 109 of the second section 90 of the refrigerant recycling apparatus 10 is connected to the second container 16. More particularly, the fourth refrigerant hose 112 is connected between the sixth releasable hose coupling fitting 110 which is exposed on the refrigerant recycling apparatus 10 and the fitting of the liquid inlet on the second container 16. The fourth shut-off valve 111 and the valve for the liquid inlet fitting on the second container 16 are then opened.

Power is then provided to the refrigerant recycling apparatus 10 and the recovery unit 12. The recovery unit 12 must be set in the pump-out position during recovery/recycling operation such that the first and third solenoid valves 30 and 42 are open and the second solenoid valve 38 is closed. This prevents refrigerant from condensing in the recovery unit condenser 34 before the oil is separated in the second section 90 of the recycling apparatus 10. Power is provided to the compressor 18 of the recovery unit 12, and the compressor 18 generates a relatively lower pressure at the suction side 18a. A flow of refrigerant is drawn from the first container 14 through the first section 50 of the refrigerant recycling apparatus 10 toward the refrigerant recovery unit 12. The refrigerant passes through the first refrigerant hose 58 and the prefilter 60 into the first conduit 54. If the refrigerant entering the first conduit 54 is liquid, the thermostat 123 detects the lower temperature of the liquid refrigerant, the thermostat 123 switches power on to the second circuit element 122 to provide power to the heater 66. The liquid refrigerant in the first section 50 of the refrigerant recycling apparatus 10 is heated by the heater 66 to vaporize the refrigerant. The vaporized refrigerant then passes through the contaminant accumulator 68 to remove additional liquid or solid contaminants from the vaporized refrigerant. The vaporized refrigerant is then filtered by the filter 52 to remove remaining moisture and any remaining contaminants. The filtered, vaporized refrigerant is then passed through the second conduit 72 and the second refrigerant hose 76 to the refrigerant recovery unit 12. The vaporized refrigerant is compressed by the compressor 18 in the refrigerant recovery unit 12 to form a relatively high temperature, high pressure vaporized refrigerant. The relatively high temperature, high pressure vaporized refrigerant is passed through the outlet conduit 32 of the recovery unit 12 directly to the recovery unit outlet 22, with the second solenoid valve 38 and the check valve 46 preventing the flow of the refrigerant into the recovery unit condenser 34. The high temperature, high pressure vaporized refrigerant is then passed from the outlet 22 of the refrigerant recovery unit 12 through the third refrigerant hose 98 to the inlet 95 of the second section 90 of the refrigerant recycling apparatus 10. The high temperature, high pressure vaporized refrigerant is then passed through the oil separator 102 to separate oil from the high temperature, high pressure vaporized refrigerant in the second section 90 of the refrigerant recycling unit 10 prior to condensing the refrigerant. The high temperature, high pressure vaporized refrigerant is then passed to the condenser 92 to condense to form a high temperature, high pressure liquid refrigerant. The liquid refrigerant is passed through the condenser outlet 92b, the fourth conduit 108 and the fourth refrigerant hose 112 to the second container 16. When enough of the separated oil has accumulated in the oil separator 102, the float valve 105 opens and the separated oil is transferred into the first section 50 of the refrigerant recycling apparatus 10 into the flow of refrigerant being drawn from the first container 14.

When the second container reaches about 80% capacity, power to the recovery unit 12 is turned off, and the fourth shut-off valve 111 of the recycling apparatus 10 and the valve on the second container 16 are closed. The full container 16 is then removed, and a new, empty second container 16 is attached to the fourth refrigerant hose 112. The fourth shut-off valve 111 is then opened, and power is again provided to the compressor 18 of the recovery unit 12, and the process continues until the refrigerant within the first container 14 has been removed to a level acceptable by the EPA, as indicated by a reading of 0 psi on the pressure gauge 78. For recovering refrigerant from systems with less than 200 pounds of refrigerant; a 10 inch vacuum is required. All of the shut-off valves on the recycling apparatus 10 and the recovery unit 12 are then closed, and the refrigerant recycling apparatus can be disconnected from the first and second containers 14 and 16 and the recovery unit 12.

It is important during the recovery/recycling operation to pay attention to the contaminant accumulator sight glass 69 during recovery/recycling operations. When the contaminants are level with the sight glass, the accumulator 68 must be drained and the contaminants must be properly disposed. Contaminants are drained by shutting off power to the compressor in the recovery unit 12 and closing the first, second, third and fourth shut-off valves 62, 80, 100 and 111 of the recycling apparatus 10. A hose is connected between the vapor valve of the second container and the third hose coupling 56. The valve on the second container 16 is opened and vapor from the second container 16 is used to pressurize the first section 50 of the recycling apparatus 10. The accumulator drain valve 70 is then opened to drain contaminants from the accumulator 68.

When used in conjunction with a recovery unit 12, and appropriate filters 60 and 52, the recycling apparatus 10 will clean refrigerants to the requirements of ARI industry recycling guideline IRG-2 concerning water, chloride ion, acidity, non-boiling residues and particulates/solids.

The present invention also provides a method of clearing trapped refrigerant from the refrigerant recycling apparatus 10 being used in conjunction with the refrigerant recovery unit 12. The method of clearing trapped refrigerant from the recycling apparatus 10 will be described generally with reference to FIG. 3.

To prepare for clearing trapped refrigerant from the refrigerant recycling apparatus 10, a fluid connection between the first and second sections 50 and 90 of the refrigerant recycling apparatus 10 and the suction side 18a of the compressor 18 of the recovery unit 12 is provided. More particularly, the second refrigerant hose 76 is fluidly connected between the fourth hose coupling fitting 74 at the outlet 73 of the first- section 50 and a manifold 132. The fourth refrigerant hose 112 is fluidly connected between the sixth hose coupling fitting 110 at the outlet 109 of the second section 90 and the manifold 132. The manifold 132 is fluidly connected to the first hose coupling fitting 20 at the inlet 19 of the recovery unit 12 by the manifold refrigerant hose 134. The third refrigerant hose 98 is fluidly connected between the outlet hose coupling fitting 25 of the refrigerant recovery unit 12 and the inlet of the second container 16. The recovery unit is set in the pump-out mode such that the first and third solenoid valves 30 and 42 are open and the second solenoid valve 38 is closed so that refrigerant passes from the compressor outlet 18b through the outlet conduit 32 and the third refrigerant hose 98 into the second container 16. The first and third shut-off valves 62 and 100 of the recycling apparatus 10 are in the closed position, and the second and fourth shut-off valves 80 and 111 of the recycling apparatus 10, the inlet and outlet shut-off valves 21 and 23 of the recovery unit 12, and the tank liquid port are in the open position.

Power is then provided to the compressor 18 of the recovery unit 12 to draw a vacuum with the compressor 18 in the first and second sections 50 and 90 of the refrigerant recycling apparatus 10 as well as in the condenser 34 of the recovery unit itself. The refrigerant is discharged by the compressor into the second container 16. When the inlet pressure gauge 24 of the recovery unit 12 indicates 10 inches of vacuum, pump-out is complete. Power to the recovery unit 12 is turned off and all valves are closed.

For recycling refrigerant from a first container 14 using an oilless recovery unit (not shown), only the first section 50 of the recycling apparatus 10 is required. The first container 14 is connected with the first refrigerant hose 58 to the third hose coupling fitting 56 at the inlet 55 to the first section 50 of the recycling apparatus 10 and the outlet 73, with the fourth hose coupling fitting 74 of the first section 50 of the refrigerant recycling apparatus 10 is connected to the first inlet hose coupling fitting 20 of the refrigerant recovery unit 12. The outlet 22 of the oilless recovery unit is connected to the second container 16. The oilless recovery unit is then operated in the normal recovery mode to recover and recycle refrigerant from the first container 14.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A refrigerant handling system comprising:
   a refrigerant recycling apparatus and a refrigerant recovery unit, said refrigerant recycling apparatus having a first section including a filter having a filter inlet and a filter outlet;
   a first conduit for providing fluid communication between the filter inlet and a first container;
   a heater located along the first conduit;
   a second conduit for providing fluid communication between the filter outlet and the refrigerant recovery unit;
   a second section including an oil separator and a condenser having an inlet and an outlet, said oil separator and said condenser being fluidly connected in series; and
   a third conduit for providing fluid communication between the refrigerant recovery unit and the oil separator, the condenser inlet being in fluid communication with the oil separator, and wherein said refrigerant recycling apparatus includes a conduit for providing fluid communication between the condenser outlet and a second container; and
   wherein said refrigerant recovery unit includes a compressor having a suction side and a discharge side, the suction side being in fluid communication with an inlet for connection to said refrigerant recycling apparatus, and the discharge side being in fluid communication with a recovery unit outlet; and
   releasable coupling hoses connected between the refrigerant recycling apparatus and the refrigerant recovery unit.

2. The system of claim 1 further comprising an oil return line between the oil separator and the first conduit.

3. The system of claim 2 further comprising a float valve actuatable between an open and a closed position to control the flow of oil through the oil return line.

4. The system of claim 1 further Comprising a contaminant accumulator in fluid communication with the first conduit between the filter and the heater.

5. A refrigerant handling system for transferring refrigerant from a first container through a refrigerant recovery hose with a releasable hose coupling fitting to a second container through a refrigerant discharge hose with a releasable hose coupling fitting, the system comprising a refrigerant recycling apparatus and a refrigerant recovery unit connected by releasable coupling hoses;

the refrigerant recovery unit including a compressor having a suction side and a discharge side, the suction side being in fluid communication with a first releasable hose coupling fitting exposed on the refrigerant recovery unit, and the discharge side being in fluid communication with a second releasable hose coupling fitting exposed on the refrigerant recovery unit; and the refrigerant recycling apparatus comprising:
   a first section including a filter having a filter inlet and a filter outlet;
   a first conduit in fluid communication between the filter inlet and a third releasable hose coupling fitting exposed on the apparatus, the third releasable hose coupling fitting being adapted for connection with the releasable hose coupling fitting of the refrigerant recovery hose;
   a heater located along the first conduit;
   a second conduit in fluid communication between the filter outlet and a fourth releasable hose coupling fitting exposed on the apparatus, the fourth releasable hose coupling fitting being releasably connected by one of said releasable coupling hoses to the first releasable hose coupling fitting on the refrigerant recovery unit;
   a second section including an oil separator fluidly connected in series with a condenser having a condenser inlet and a condenser outlet;
   a third conduit in fluid communication between the oil separator and a fifth releasable hose coupling fitting exposed on the apparatus, the fifth releasable hose coupling fitting being releasably connected by another one of said releasable coupling hoses to the second releasable hose coupling fitting on the refrigerant recovery unit; and
   a fourth conduit in fluid communication between the condenser outlet and a sixth releasable hose coupling fitting exposed on the apparatus, the sixth releasable hose coupling fitting being adapted for connection with the releasable hose coupling fitting of the refrigerant discharge hose.

6. The system of claim 5 further comprising an oil return line between the oil separator and the first conduit.

7. The system of claim 6 further comprising a float valve actuatable between an open and a closed position to control the flow of oil through the oil return line.

8. The system of claim 5 further comprising a contaminant accumulator in fluid communication with the first conduit between the filter and the heater.

9. A refrigerant handling system for transferring refrigerant from a first container to a second container comprising:
   a recycling apparatus, a recovery unit and fluid conduits (76, 98);
   said recycling apparatus includes an inlet coupling and an outlet coupling, a heater, a filter, an oil separator and a condenser;
   said recovery unit includes an inlet coupling and an outlet coupling and a compressor having a compressor inlet and a compressor outlet; and
   wherein said recycling apparatus and said recovery unit are releasably connected to one another by said fluid conduits.

10. The system of claim 9 wherein the heater and the filter are in fluid communication.

11. The system of claim 9 further comprising a contaminant accumulator in fluid communication between the filter and the heater.

* * * * *